US012802322B2

(12) United States Patent
Ke et al.

(10) Patent No.: US 12,802,322 B2
(45) Date of Patent: Nov. 17, 2026

(54) IMAGE PROCESSING METHOD AND APPARATUS, AND DEVICE AND STORAGE MEDIUM

(71) Applicant: Beijing Zitiao Network Technology Co., Ltd., Haidian District (CN)

(72) Inventors: Yimin Ke, Beijing (CN); Hua Long, Beijing (CN); Xiao Peng, Beijing (CN); Jiali Ye, Beijing (CN); Jun Jiang, Beijing (CN); Feng Zhu, Beijing (CN); Jiawei Wen, Beijing (CN); Hengkai Guo, Beijing (CN); Jiaming Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 112 days.

(21) Appl. No.: 18/832,750

(22) PCT Filed: Jan. 17, 2023

(86) PCT No.: PCT/CN2023/072497
§ 371 (c)(1),
(2) Date: Jul. 24, 2024

(87) PCT Pub. No.: WO2023/138548
PCT Pub. Date: Jul. 27, 2023

(65) Prior Publication Data

US 2025/0104319 A1 Mar. 27, 2025

(30) Foreign Application Priority Data

Jan. 24, 2022 (CN) ......................... 202210079134.1

(51) Int. Cl.
*G06T 13/20* (2011.01)
*G06T 7/70* (2017.01)
(Continued)

(52) U.S. Cl.
CPC .............. *G06T 13/205* (2013.01); *G06T 7/70* (2017.01); *G06T 13/40* (2013.01); *G06T 19/20* (2013.01);
(Continued)

(58) Field of Classification Search
CPC G06T 13/40; G06T 7/70; G06T 19/20; G06T 2219/2016; G06T 13/205;
(Continued)

(56) References Cited

U.S. PATENT DOCUMENTS

| | | | |
|---|---|---|---|
| 10,755,463 | B1 | 8/2020 | Albuz et al. |
| 11,176,724 | B1 | 11/2021 | Sinha et al. |

(Continued)

FOREIGN PATENT DOCUMENTS

| | | | |
|---|---|---|---|
| CN | 108769535 | A | 11/2018 |
| CN | 109271553 | A | 1/2019 |

(Continued)

OTHER PUBLICATIONS

ISA China National Intellectual Property Administration, International Search Report and Written Opinion Issued in Application No. PCT/CN2023/072497, Apr. 22, 2023, WIPO, 13 pages.

(Continued)

*Primary Examiner* — Phi Hoang
(74) *Attorney, Agent, or Firm* — Alleman Hall LLP

(57) ABSTRACT

An image processing method and apparatus, and a device and a storage medium. The method includes: in response to a received service execution instruction, identifying a target object in a video stream which is captured in real time, and determining position information of the target object in the video stream; displaying a virtual model on the target object in the video stream according to the position information; and playing a target audio on loop, and controlling, accord- (Continued)

ing to the target audio, the virtual model to display a corresponding animation expression.

20 Claims, 4 Drawing Sheets

(51) Int. Cl.
*G06T 13/40* (2011.01)
*G06T 19/20* (2011.01)

(52) U.S. Cl.
CPC ................. *G06T 2219/2004* (2013.01); *G06T 2219/2016* (2013.01)

(58) Field of Classification Search
CPC ........ G06T 2219/2004; H04N 21/4223; H04N 21/431; H04N 21/8146; H04N 21/854; H04N 21/816; H04N 21/8106
See application file for complete search history.

(56) References Cited

U.S. PATENT DOCUMENTS

| | | | | |
|---|---|---|---|---|
| 2012/0026174 | A1* | 2/2012 | McKeon | G06T 13/40 345/473 |
| 2019/0043239 | A1* | 2/2019 | Goel | G06T 13/205 |
| 2019/0054379 | A1 | 2/2019 | Ackley et al. | |
| 2020/0275875 | A1* | 9/2020 | Johnstone | A61B 5/0008 |
| 2020/0380031 | A1 | 12/2020 | Zhou et al. | |
| 2021/0076107 | A1* | 3/2021 | Quek | H04N 21/812 |
| 2021/0264656 | A1* | 8/2021 | Barlier | H04L 51/52 |
| 2021/0397411 | A1* | 12/2021 | Plom | H04L 51/10 |
| 2023/0117639 | A1* | 4/2023 | Moon | G06V 10/58 382/191 |

FOREIGN PATENT DOCUMENTS

| | | | |
|---|---|---|---|
| CN | 110286756 | A | 9/2019 |
| CN | 110647636 | A | 1/2020 |
| CN | 110874557 | A | 3/2020 |
| CN | 110955332 | A | 4/2020 |
| CN | 111833461 | A | 10/2020 |
| CN | 112034984 | A | 12/2020 |
| CN | 112541959 | A | 3/2021 |
| CN | 113365146 | A | 9/2021 |
| CN | 114419213 | A | 4/2022 |
| IN | 201747001399 | A | 5/2017 |

OTHER PUBLICATIONS

China National Intellectual Property Administration, Office Action Issued in Application No. 202210079134.1, Feb. 18, 2025, 15 pages.

Zhao, Y. et al., "Mask-off: Synthesizing Face Images in the Presence of Head-mounted Displays," IEEE, Aug. 15, 2019, 12 pages.

Tao, C., "Research on Real-Time Global Illumination Technology of Mixed Reality," Thesis, School of Computer Science and Engineering, Southeast University, May 8, 2018, 78 pages. English abstract on p. 9.

* cited by examiner

IMAGE PROCESSING METHOD AND APPARATUS, AND DEVICE AND STORAGE MEDIUM

CROSS-REFERENCE TO RELATED APPLICATIONS

The present application is a national stage of the International application PCT/CN2023/072497, filed on Jan. 17, 2023. This International application claims priority of the Chinese Patent Application No. 202210079134.1 filed with the Chinese Patent Office on Jan. 24, 2022. All of these applications are hereby incorporated by reference in their entireties.

TECHNICAL FIELD

The present disclosure relates to the technical field of internet application, and in particular to an image processing method and apparatus, a device and a storage medium.

BACKGROUND

With the continuous development of Internet technology, various interesting effect applications have been appeared on the network, and users can choose the corresponding effect applications to shoot videos. However, the effect applications in the related art are relatively simple in forms, with poor combination tightness with real environments, which cannot satisfy the personalized display requirements of virtual information.

SUMMARY

Embodiments of the present disclosure provide an image processing method and apparatus, a device and a storage medium, which can improve the combination tightness with real environments and satisfy the personalized display requirements of virtual information.

In a first aspect, an embodiment of the present disclosure provides an image processing method, including:

- identifying a target object in a video stream captured in real time in response to a received service execution instruction, and determining position information of the target object in the video stream;
- displaying a virtual model on the target object in the video stream according to the position information; and
- playing a target audio on loop, and controlling the virtual model to display a corresponding animation expression according to the target audio.

In a second aspect, an embodiment of the present disclosure provides an image processing apparatus, including:

- a determination module, configured to identify a target object in a video stream captured in real time in response to a received service execution instruction, and determine position information of the target object in the video stream;
- a first display module, configured to display a virtual model on the target object in the video stream according to the position information; and
- a control module, configured to play a target audio on loop, and control the virtual model to display a corresponding animation expression according to the target audio.

In a third aspect, an embodiment of the present disclosure provides an electronic device, including a memory and a processor, wherein a computer program is stored in the memory, and the processor, when executing the computer program, realizes the image processing method provided in the first aspect of embodiments of the present disclosure.

In a fourth aspect, an embodiment of the present disclosure provides a computer-readable storage medium having a computer program stored therein, wherein the computer program, when executed by a processor, realizes the image processing method provided in the first aspect of embodiments of the present disclosure.

BRIEF DESCRIPTION OF DRAWINGS

Throughout the drawings, the same or similar reference numerals indicate the same or similar elements. It should be understood that the drawings are schematic, and the components and elements are not necessarily drawn to scale.

DETAILED DESCRIPTION

Figure 1:
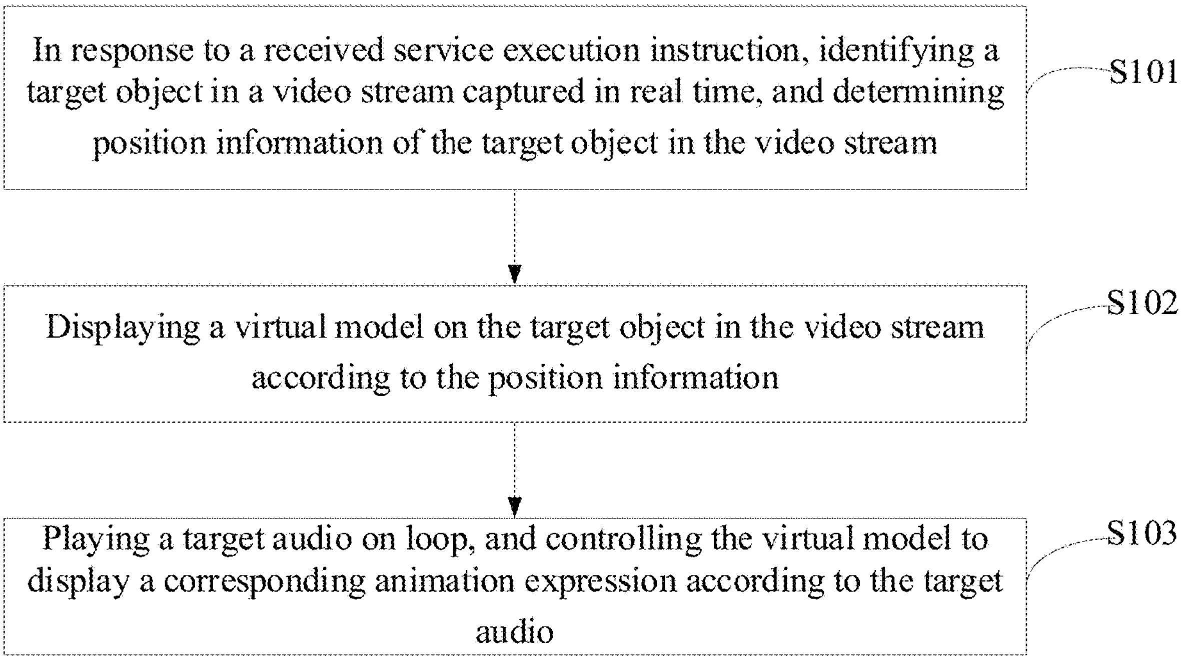
FIG. 1 is a flowchart of an image processing method provided by an embodiment of the present disclosure.

Embodiments of the present disclosure will be described below with reference to the accompanying drawings. Although embodiments of the present disclosure are shown in the drawings, it should be understood that the present disclosure can be embodied in various forms and should not be construed as limited to the embodiments set forth here. It should be understood that the drawings and embodiments of the present disclosure are only used for illustrative purposes.

It should be understood that the steps described in the method embodiments of the present disclosure may be performed in a different order and/or in parallel. Furthermore, method embodiments may include additional steps and/or may not perform some of the illustrated steps.

As used herein, the term “comprise/include” and its variants are open-ended, that is, “including but not limited to”. The term “based on” refers to “at least partially based on”. The term “one embodiment” means “at least one embodiment”; the term “another embodiment” means “at least one other embodiment”; and the term “some embodiments” means “at least some embodiments”. Related definitions of other terms will be given in the following description.

It should be noted that the concepts of “first” and “second” mentioned in the present disclosure are only used to distinguish different devices, modules or units, and are not used to limit the order or interdependence of the functions performed by these devices, modules or units.

It should be noted that the modifications of “a” and “a plurality” mentioned in the present disclosure are schematic, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

FIG. 1 is a flowchart of an image processing method provided by an embodiment of the present disclosure. As shown in FIG. 1, the method may include:

S101, identifying a target object in a video stream captured in real time in response to a received service execution instruction, and determining position information of the target object in the video stream.

The above-mentioned video stream can be a video stream composed of a plurality of frames of original images in the real world captured in real time through a rear camera of an electronic device. The target object can be understood as an object existing in the video stream, e.g., characters and various articles that are captured in the real world.

After obtaining the service execution instruction, the electronic device can identify the target object in the video stream captured in real time through a preset detection algorithm and locate the position information of the target object in the video stream. The position information can be the coordinate information of the pixel point of the target object.

As an alternative embodiment, a service control can be displayed in the interface of the video stream, and the service control is used to trigger the service execution instruction. The user can trigger the service control by touching or voice, so that when the triggering operation for the service control is obtained, the electronic device recognizes the video stream captured by the camera in real time to determine the target object in the video stream and the position information of the target object.

S102, displaying a virtual model on the target object in the video stream according to the position information.

Figure 2:
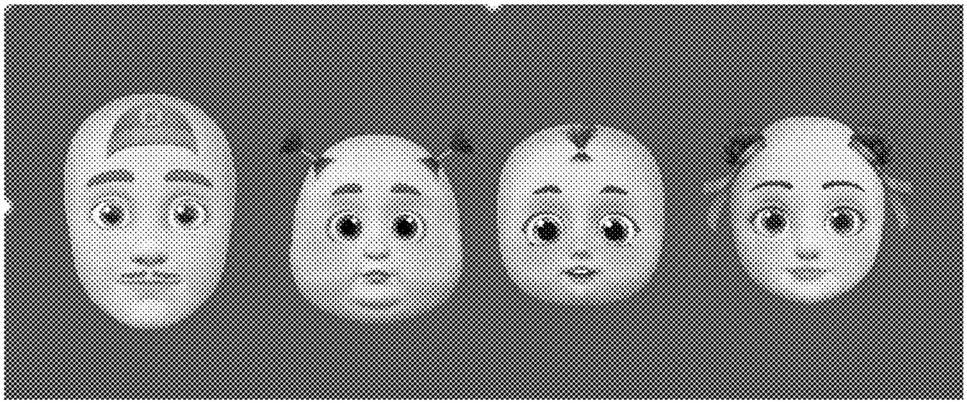
FIG. 2 is a schematic diagram of a virtual model provided by an embodiment of the present disclosure.

The virtual model can be a pre-drawn three-dimensional model, such as various virtual face images as shown in FIG. 2. Of course, other types of virtual models can also be drawn according to actual needs, and the types and styles of virtual models can be determined according to actual demands.

After obtaining the position information of the target object, the electronic device can convert the position information into a three-dimensional space, thus obtaining the spatial position information of the target object. The electronic device can display the virtual model on the target object in the video stream based on the spatial position information. Displaying the virtual model on the target object in the video stream can be understood as superimposing the virtual model on the target object in the video stream and displaying the superimposed video stream.

In an exemplary implementation, the virtual model can be rendered to a second layer, and the transparency of the area except the virtual model in the second layer is set to zero, that is, the area except the virtual model in the second layer is a transparent area. The layer where the current frame of image in the video stream is located is a first layer, and the second layer and the first layer are synthesized to display the virtual model on the target object in the video stream.

S103, playing a target audio on loop, and controlling the virtual model to display a corresponding animation expression according to the target audio.

The target audio can be a pre-made audio file. At the same time, an initial animation expression is made for the virtual model in advance, and the initial animation expression is adjusted by optimizing the waveform of the target audio so as to obtain a target animation expression. Since a target animation expression is adjusted by optimizing the waveform of the target audio, the target animation expression of the virtual model matches with the target audio. In this way, when the target audio is played on loop, the electronic device can control the virtual model to display the corresponding animation expression based on the audio data played by the target audio.

For example, the process of making the initial animation expression for the virtual model can be as follows: creating a corresponding controller through expression codes of a Max script controller, and making the initial animation expression by using the controller to drive the bones in the corresponding grid of the virtual model. After making the controller animation, collapsing the controller animation, thus completing the production of the initial animation expression of the virtual model.

Optionally, when there are multiple virtual models in the video stream, different virtual models can display different animation expressions during playing the target audio. For this reason, optionally, the target audio can include multiple audio tracks, and different audio tracks are used to control different virtual models, and the animation expressions of the virtual models corresponding to different audio tracks are different.

Therefore, the process of controlling the virtual model to display the corresponding animation expression according to the target audio in S103 can be as follows: controlling the virtual model corresponding to the audio track to display the corresponding animation expression according to the currently played data of audio track.

For example, given that the target audio includes four audio tracks, and four virtual models are also displayed in the video stream. When the chorus of the four audio tracks is played, the four virtual models in the video stream display different animation expressions at the same time. When the date of an audio track is played, the virtual model corresponding to the audio track in the video stream displays the corresponding animation expression, and the other virtual models can keep the initial expression until the data of audio track corresponding thereto is played, then the other virtual models display corresponding animation expressions, thus realizing the effect that different virtual models display different animation expressions with the playing of the audio data.

Optionally, the subtitle information corresponding to the target audio can be displayed synchronously in the interface of the video stream.

The display forms of the subtitle information are diversified, that is, the subtitle information can be displayed according to any display parameter associated with fonts. For example, the display parameters can be font color, font size, text effect, layout, background color and so on.

Optionally, a shooting control can also be displayed in the interface of the video stream, which is used to end the above flow corresponding to the image processing method. That is to say, when the shooting control is triggered, the above flow corresponding to the image processing method is ended, and a flow of shooting video or image is entered.

As an alternative embodiment, in the process of real-time video stream acquisition by the rear camera of the electronic device, a service control and a shooting control are displayed in the interface of the video stream. After the triggering operation for the service control is obtained, a preset first animation sequence frame is played, and a preset second animation sequence frame can be played during the playing of the first animation sequence frame. The first animation sequence frame and the second animation sequence frame are different. Optionally, the first animation sequence frame can be a full-screen scanning animation sequence frame, which is used to prompt that the real world is currently being scanned; the second animation sequence frame can be a colored-ribbon animation sequence frame, so as to enrich the effect of picture display and relieve the anxiety of users in the process of image processing due to waiting. The above-mentioned animation sequence frames can be set based on actual requirements, and may include only the first animation sequence frame, or only the second animation sequence frame, or both of the first animation sequence frame and the second animation sequence frame, thereby enriching the effect of picture display. This embodiment here is only an example.

Figure 3:
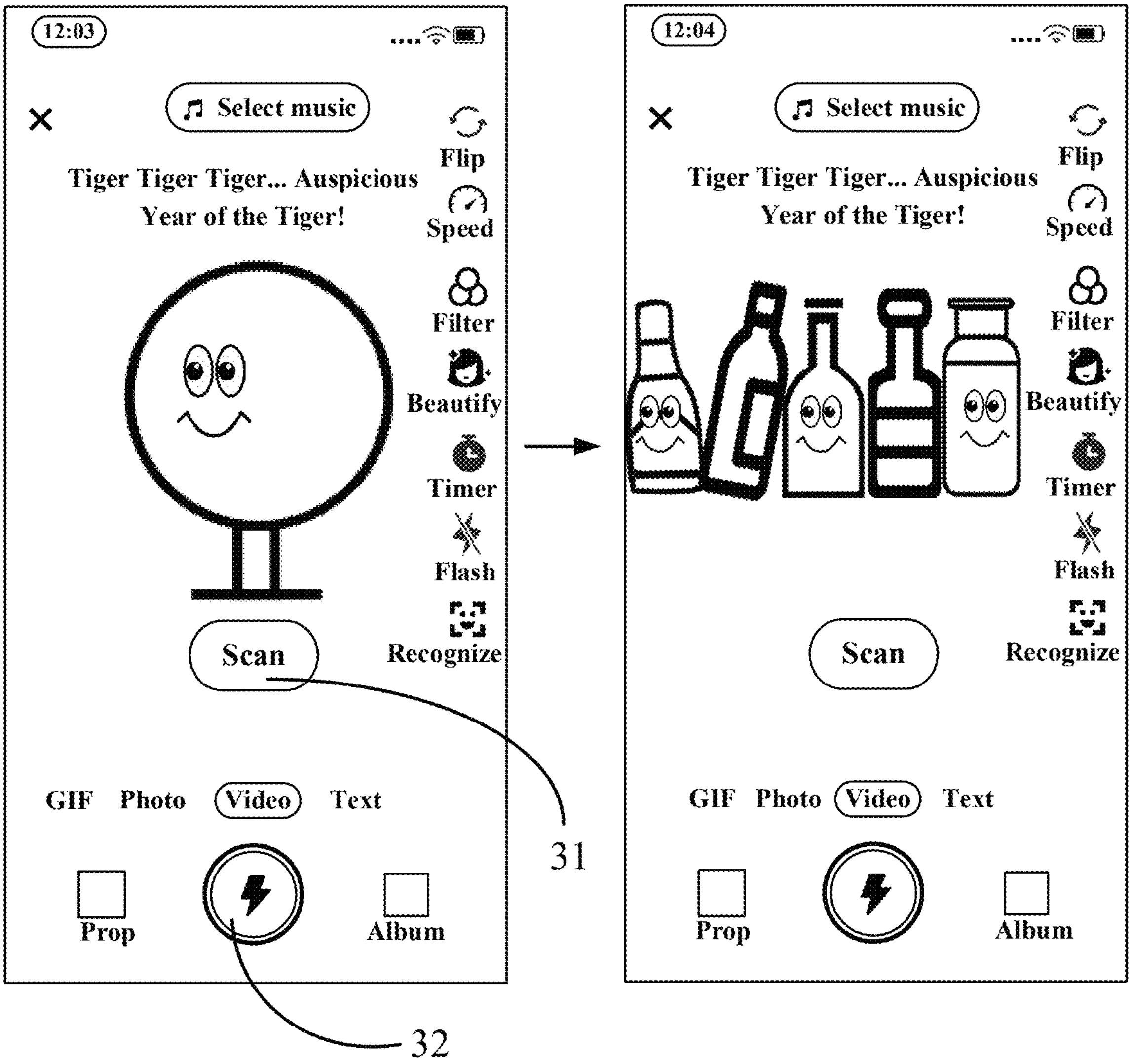
FIG. 3 is a schematic diagram of an image processing result provided by an embodiment of the present disclosure.

In the process of playing the first animation sequence frame and the second animation sequence frame, the electronic device identifies the target object in the video stream captured in real time, determines the position information of the target object in the video stream, and displays the virtual model on the target object in the video stream based on the position information. In this way, after the playing of the first animation sequence frame and the second animation sequence frame is finished, the electronic device can display the animation expression of the virtual model in the video stream. The expression of the virtual model in the video stream can also be dynamically changed based on the played audio data. When the real scene changes, that is, when a service execution instruction is obtained again, the electronic device can display the virtual model on a new target object identified in the video stream; and at the same time, the expression of the virtual model dynamically changes with the played target audio. As shown in FIG. 3, after the service execution instruction is triggered by the service control 31 (that is, the "scan" button in FIG. 3), the electronic device can display the virtual model on the electric fan in the video stream; when the real scene changes, the scanning of the real scene is triggered again, and the scanned target object may change at this time, and the electronic device can also display the corresponding virtual model on the changed target object. After the triggering operation for the shooting control 32 is obtained, the service control 31 disappears, the flow of shooting video or image is entered, and the flow corresponding to the image processing method is ended.

According to the image processing method provided by the embodiment of the present disclosure, in response to a received service execution instruction, a target object in a video stream captured in real time is identified, position information of the target object in the video stream is determined, a virtual model is displayed on the target object in the video stream according to the position information, a target audio is played on loop, and the virtual model is controlled to display a corresponding animation expression according to the target audio, so as to achieve the effect of displaying the virtual model on the object in the video stream of any real environment, and to control the animation expression of the displayed virtual model based on the played audio data, which improves the combination tightness between the real environment and the virtual information, enhances the interest of virtual information display, and satisfies the personalized display requirements of users for virtual information.

Figure 4:
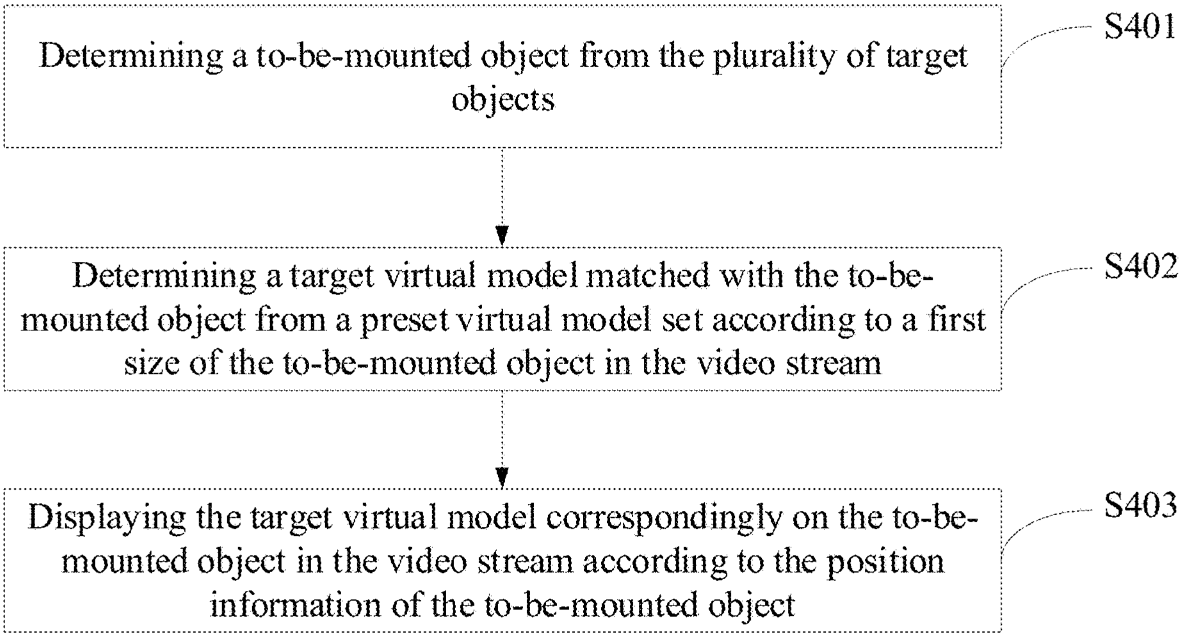
FIG. 4 is a flowchart of a virtual model presentation process provided by the embodiment of the present disclosure.

In one embodiment, when it is recognized that the video stream contains a plurality of target objects, the virtual model can be displayed with reference to the process described in the following embodiment. On the basis of the above-mentioned embodiment, optionally, as shown in FIG. 4, the process of S102 may include:

S401, determining a to-be-mounted object from a plurality of target objects.

An object with virtual model mounting capability can be referred to as a to-be-mounted object. "Mounting" here can be understood as "showing/displaying". By identifying the video stream, a plurality of target objects can be obtained. These target objects differ in sizes, that is, some target objects are smaller in size, which is not suitable for displaying virtual models thereon. Based on this, in order to improve the display effect of virtual information in the video stream, the electronic device can select an object with model mounting capability from a plurality of target objects as the object to be mounted (to-be-mounted object). For example, based on first sizes of a plurality of target objects, an object with the top ranking in the first size can be determined as the to-be-mounted object, or an object with the first size larger than a preset size can be determined as the to-be-mounted object.

It should be noted that there may be one or a plurality of to-be-mounted objects.

S402, determining a target virtual model matched with the to-be-mounted object from a preset virtual model set according to a first size of the to-be-mounted object in the video stream.

The preset virtual model set includes a plurality of virtual models with different sizes. In such case, the electronic device can determine the target virtual model matched, in size, with the to-be-mounted object from the preset virtual model set based on the first size of the to-be-mounted object. For example, based on the ranking results of the first sizes of a plurality of to-be-mounted objects, the target virtual models matched with the plurality of to-be-mounted objects can be determined from the preset virtual model set. If the first sizes of the to-be-mounted objects are sorted from large to small, the corresponding target virtual models can also be selected from the preset virtual model set in the order from large to small, so that the target virtual model with which the to-be-mounted object having larger first size is matched is also larger, and the target virtual model with which the to-be-mounted object having smaller first size is matched is also smaller.

S403, displaying the target virtual model correspondingly on the to-be-mounted object in the video stream according to the position information of the to-be-mounted object.

After determining the target virtual model with which the to-be-mounted object is matched, the electronic device can correspondingly display the target virtual model on the to-be-mounted object in the video stream based on the position information of the to-be-mounted object. That is to say, the small-sized target virtual model is displayed on the to-be-mounted object with small first size, and the large-sized target virtual model is displayed on the to-be-mounted object with large first size, thus realizing the accurate display of the virtual model.

The electronic device can also locate the to-be-mounted object in real time to determine whether the position of the to-be-mounted object has changed in the video stream; if so, the target virtual model is correspondingly displayed on the to-be-mounted object in the video stream according to the changed position information.

For example, the electronic device can track the position of the to-be-mounted object by using Simultaneous Localization and Mapping (SLAM) algorithm, and obtain the position change of the to-be-mounted object in real time.

After determining that the position of the to-be-mounted object has changed in the video stream, the electronic device can adjust the displaying position of the target virtual model based on the changed position information, so that the target virtual model can be stably displayed on the to-be-mounted object.

In this embodiment, based on the size of the to-be-mounted object in the video stream, the electronic device can select the target virtual model matched with the to-be-mounted object and display it on the to-be-mounted object in the video stream, so that the displayed virtual information can be tightly combined with the object in the real environment, thereby further improving the combination tightness between the real environment and the virtual information, and also improving the effect of picture display. Moreover, the displaying position of the target virtual model can be adjusted based on the real-time positioning result of the to-be-mounted object, so that the stability of the display of the target virtual model is realized and the image processing effect is improved.

In one embodiment, when the position information of the to-be-mounted object in the video stream changes, the size of the to-be-mounted object in the video stream will also change. That is, the farther the electronic device is from the to-be-mounted object, the smaller the size of the to-be-mounted object in the video stream; and the closer the electronic device is to the to-be-mounted object, the larger the size of the to-be-mounted object in the video stream. Based on this situation, the method can also include: acquiring a second size of the to-be-mounted object in the video stream by the electronic device, and adjusting the target virtual model by scaling according to the second size.

The second size is different from the first size. That is, after the size of the identified to-be-mounted object changes, the electronic device can adjust the target virtual model displayed on the to-be-mounted object by scaling based on the changed size (i.e. the second size). When the second size is larger than the first size, the target virtual model is enlarged according to a corresponding factor, and when the second size is smaller than the first size, the target virtual model is reduced according to a corresponding factor, so that the target virtual model adjusted by scaling is adapted to the size of the to-be-mounted object. The expression "adapted to" here can be understood as: the size ratio of the adjusted target virtual model to the to-be-mounted object is equal to a preset ratio.

Optionally, the process of adjusting the target virtual model by scaling according to the second size may include: acquiring a size adjustment operation instruction for the target virtual model; and adjusting the target virtual model by scaling according to the size adjustment operation instruction.

In the embodiment of the present disclosure, an automatic adjustment of the size of the target virtual model can be supported, and a manual adjustment of the size of the target virtual model can also be supported, thus realizing the interactivity between users and virtual information. Optionally, the target virtual model can support the user's touch operation, that is, the user adjusts the size of the target virtual model by means of corresponding touch operation. In this way, when the user's size adjustment operation instruction of enlarging the target virtual model is acquired, the electronic device adjusts the target virtual model by enlarging; when the user's size adjustment operation instruction of reducing the target virtual model is acquired, the electronic device adjusts the target virtual model by reducing. The enlargement ratio and the reduction ratio can be determined based on the acquired touch operation.

In this embodiment, the electronic device can adjust the displayed target virtual model by scaling in real time based on the size change of the to-be-mounted object in the video stream, so as to adapt the target virtual model to the size of the to-be-mounted object, thereby enriching the display effect of the virtual information and satisfying the personalized display requirements of users for virtual information. Moreover, the target virtual model can be adjusted by scaling based on the user's triggering operation, which improves the interactivity between users and virtual information.

Figure 5:
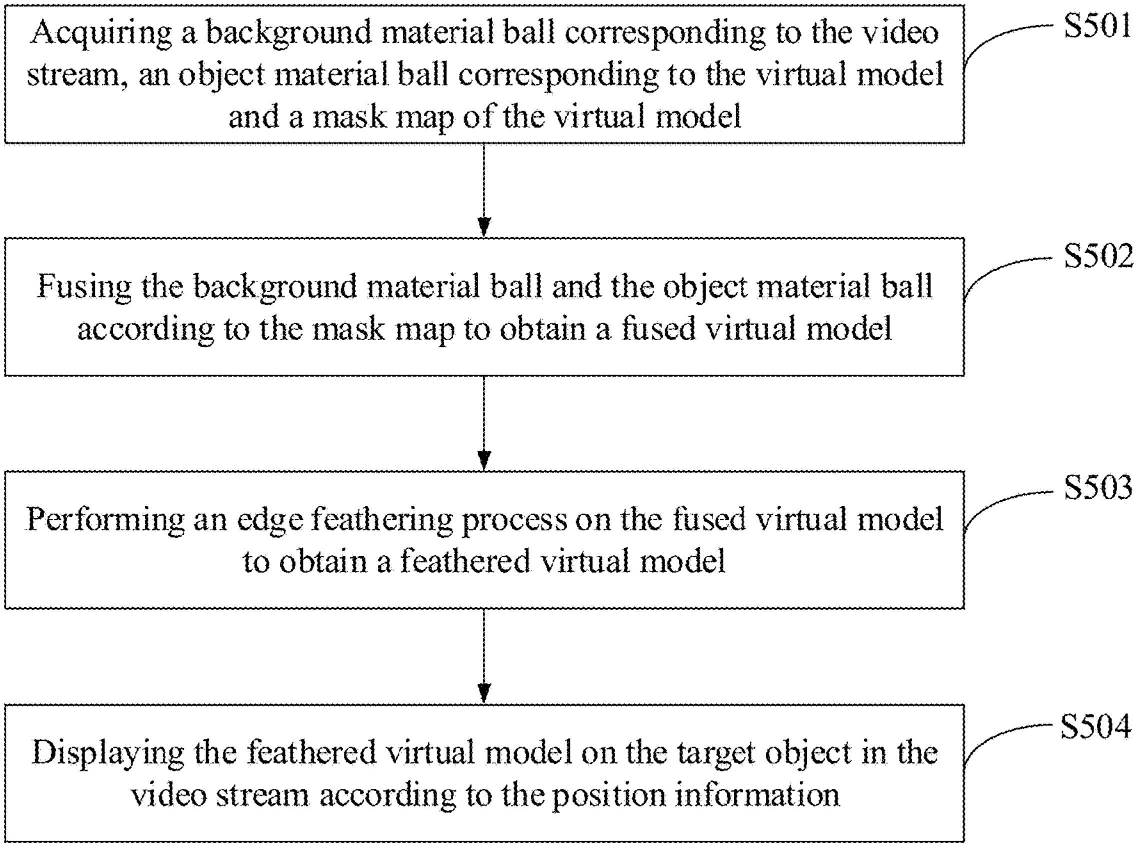
FIG. 5 is another flowchart of a virtual model presentation process provided by the embodiment of the present disclosure.

In practical application, in order to fuse the target virtual model with the objects in the real world in a better way and improve the combination tightness between virtual information and the real environment, on the basis of the above embodiment, optionally, as shown in FIG. 5, the process of S102 may include:

S501, acquiring a background material ball corresponding to the video stream, an object material ball corresponding to the virtual model and a mask map of the virtual model.

The mask map includes facial feature information and local skin color information of the virtual model. The facial feature information mainly includes information of eyes, nose, mouth and eyebrows of the virtual model, and the local skin color information can be the blush information in the virtual model.

Material can be understood as a combination of "what it's made from" and "how it feels like", with its surface having specific visual properties, briefly speaking, "how the object looks like". These visual attributes refer to the color, texture, smoothness, transparency, reflectivity, refractive index, luminosity and so on of the surface.

For different materials, they often have different visual attributes. Therefore, when displaying the virtual model on the target object, it is necessary to fuse the materials of both the virtual model and the target object to show a more realistic effect.

The background material ball can reflect the background material of the video stream, and in practical application, the corresponding background material ball can be generated based on the background of the video stream. Optionally, the background material ball can be subjected to an edge twisting process. The object material ball can reflect the material of the virtual model, and in practical application, a texture mapping matched with the virtual model can be selected from the preset texture mapping library, and a corresponding object material ball can be generated based on the texture mapping. The above-mentioned mask map can be understood as an image containing only the facial feature information and the local skin color information of the virtual model, that is, the virtual model is subjected to an image matting process in advance, so as to obtain the mask map of the virtual model.

S502, fusing the background material ball and the object material ball according to the mask map to obtain a fused virtual model.

After obtaining the object material ball corresponding to the virtual model, the background material ball corresponding to the video stream and the mask map of the virtual model, the background material ball and the object material ball are fused based on the mask map, so as to obtain the fused virtual model. As an alternative embodiment, the mask map may include three channels, namely G (Green) channel, B (Blue) channel and R (Red) channel, and the electronic device can fuse the background material ball and the object material ball according to the G channel and B channel of the mask map to obtain a fused virtual model. For example, based on the G channel and B channel of the mask map, the weight coefficient of the background material ball and the object material ball can be controlled between 0 and 1, so that a new material ball can be obtained by fusing. The new material ball can be understood as a fused virtual model.

S503, performing an edge feathering process on the fused virtual model to obtain a feathered virtual model.

The electronic device can perform a highlighting process to the fused virtual model, and perform an edge feathering process on the fused virtual model having been subjected to the highlighting process by using an edge feathering algorithm, so as to obtain the feathered virtual model.

As an alternative embodiment, the process of S503 described above may include:

S5031, acquiring edge light information of the fused virtual model.

S5032, determining a feathering range of the fused virtual model according to a R channel of the mask map and the edge light information.

The R channel of the mask map is multiplied by the acquired edge light information to obtain the feathering range of the fused virtual model.

S5033, feathering the fused virtual model according to the feathering range to obtain the feathered virtual model.

The feathering range obtained above is applied to a transparent channel A of the fused virtual model, so as to obtain the effect of edge feathering, that is, to obtain the feathered virtual model.

S504, displaying the feathered virtual model on the target object in the video stream according to the position information.

In this embodiment, the background material ball corresponding to the video stream and the object material ball corresponding to the virtual model can be fused and subjected to the edge feathering process based on the mask map of the virtual model, so that the virtual model can be more naturally fused into the background of the video stream, with clear facial feature information, thereby improving the realism of virtual information display.

Figure 6:
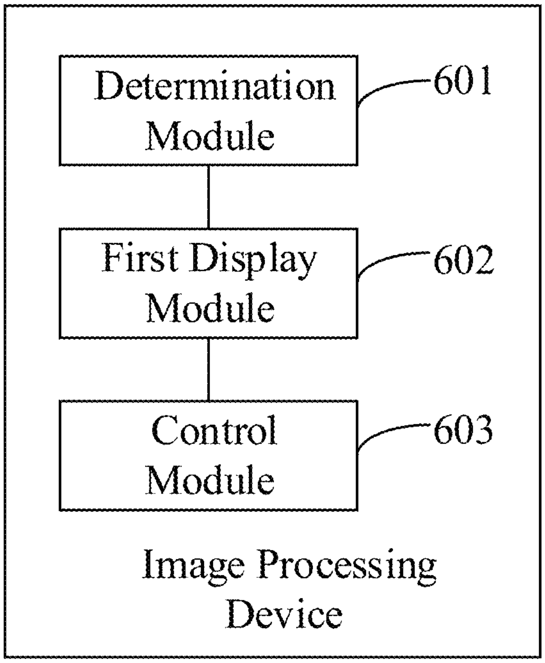
FIG. 6 is a schematic structural diagram of an image processing apparatus provided by an embodiment of the present disclosure.

FIG. 6 is a schematic structural diagram of an image processing apparatus provided by an embodiment of the present disclosure. As shown in FIG. 6, the apparatus may include a determination module 601, a first display module 602 and a control module 603.

For example, the determination module 601 is configured to identify a target object in a video stream captured in real time in response to a received service execution instruction, and determine position information of the target object in the video stream.

The first display module 602 is configured to display a virtual model on the target object in the video stream according to the position information.

The control module 603 is configured to play a target audio on loop, and control the virtual model to display a corresponding animation expression according to the target audio.

According to the image processing apparatus provided by the embodiment of the present disclosure, in response to a received service execution instruction, a target object in a video stream captured in real time is identified, position information of the target object in the video stream is determined, a virtual model is displayed on the target object in the video stream according to the position information, a target audio is played on loop, and the virtual model is controlled to display a corresponding animation expression according to the target audio, so as to achieve the effect of displaying the virtual model on an object in the video stream of any real environment, and to control the animation expression of the displayed virtual model based on the played audio data, which improves the combination tightness between the real environment and the virtual information, enhances the interest of virtual information display, and satisfies the personalized display requirements of users for virtual information.

Optionally, the target audio includes a plurality of audio tracks, different audio tracks are used to control different virtual models, and the animation expressions of the virtual models corresponding to different audio tracks are different.

The control module 603 is configured to control the virtual model to display a corresponding animation expression according to the target audio by the following way: controlling the virtual model corresponding to the audio track to display the corresponding animation expression according to the currently played data of audio track.

On the basis of the above embodiment, optionally, when a plurality of target objects is identified, the first display module 602 includes a first determination unit, a second determination unit and a first display unit.

For example, the first determination unit is configured to determine a to-be-mounted object from the plurality of target objects.

The second determination unit is configured to determine a target virtual model matched with the to-be-mounted object from a preset virtual model set according to a first size of the to-be-mounted object in the video stream; wherein the preset virtual model set includes a plurality of virtual models with different sizes.

The first display unit is configured to display the target virtual model correspondingly on the to-be-mounted object in the video stream according to the position information of the to-be-mounted object.

On the basis of the above embodiment, optionally, the first display module 602 further includes a positioning unit and a second display unit.

For example, the positioning unit is configured to position the to-be-mounted object in real time to determine whether a position of the to-be-mounted object in the video stream has changed.

The second display unit is configured to display the target virtual model correspondingly on the to-be-mounted object in the video stream according to changed position information upon determining that the position of the to-be-mounted object in the video stream has changed.

On the basis of the above embodiment, optionally, the first display module 602 further includes a first acquisition unit and an adjustment unit.

For example, the first acquisition unit is configured to acquire a second size of the to-be-mounted object in the video stream in response to a change of the position information of the to-be-mounted object in the video stream, wherein the second size is different from the first size.

The adjustment unit is configured to adjust the target virtual model by scaling according to the second size.

On the basis of the above embodiment, optionally, the adjustment unit is configured to adjust the target virtual model by scaling by the following way: acquiring a size adjustment operation instruction for the target virtual model, and adjusting the target virtual model by scaling according to the size adjustment operation instruction.

On the basis of the above embodiments, optionally, the first display module 602 may further include a second acquisition unit, a fusion unit, a feathering unit and a third display unit.

For example, the second acquisition unit is configured to acquire a background material ball corresponding to the video stream, an object material ball corresponding to the virtual model, and a mask map of the virtual model; wherein the mask map includes facial feature information and local skin color information of the virtual model.

The fusion unit is configured to fuse the background material ball and the object material ball according to the mask map to obtain a fused virtual model.

The feathering unit is configured to perform an edge feathering process on the fused virtual model to obtain a feathered virtual model.

The third display unit is configured to display the feathered virtual model on the target object in the video stream according to the position information.

On the basis of the above embodiment, optionally, the fusion unit is configured to obtain a feathered virtual model by the following way: fusing the background material ball and the object material ball according to a green channel and a blue channel of the mask map to obtain the fused virtual model.

On the basis of the above embodiments, optionally, the feathering unit is configured to obtain a feathered virtual model by the following way: acquiring edge light information of the fused virtual model, determining a feathering range of the fused virtual model according to a red channel of the mask map and the edge light information, and feathering the fused virtual model according to the feathering range to obtain the feathered virtual model.

On the basis of the above embodiment, optionally, the apparatus further includes a second display module.

For example, the second display module is configured to synchronously display subtitle information corresponding to the target audio in an interface of the video stream.

On the basis of the above embodiment, optionally, the apparatus further includes a third display module.

For example, the third display module is configured to display a service control and a shooting control in an interface of the video stream; wherein the service control is configured to trigger the service execution instruction, and the shooting control is configured to end a flow corresponding to the image processing method.

Figure 7:
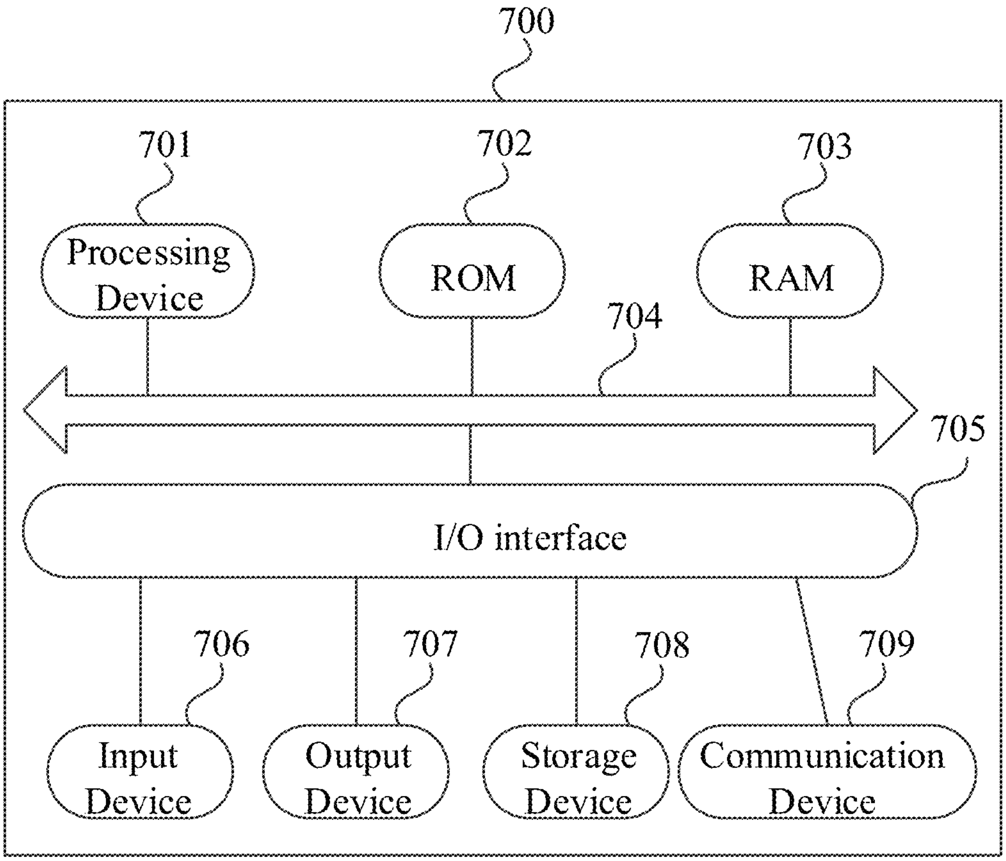
FIG. 7 is a schematic structural diagram of an electronic device provided by an embodiment of the present disclosure.

Reference is now made to FIG. 7, which shows a schematic structural diagram of an electronic device 700 suitable for implementing an embodiment of the present disclosure. The electronic device in the embodiment of the present disclosure may include, but is not limited to, mobile terminal such as mobile phone, notebook computer, digital broadcast receiver, PDA (Personal Digital Assistant), PAD (Portable Android Device), PMP (Portable Multimedia Player) and vehicle-mounted terminal (such as vehicle-mounted navigation terminal), and fixed terminal such as digital television (i.e., digital TV) and desktop computer. The electronic device shown in FIG. 7 is only an example.

As shown in FIG. 7, an electronic device 700 may include a processing device (such as a central processing unit, a graphics processor, etc.) 701, which may perform various appropriate actions and processes according to a program stored in a read-only memory (ROM)702 or a program loaded from a storage device 706 into a random-access memory (RAM)703. In the RAM 703, various programs and data required for the operation of the electronic device 700 are also stored. The processing device 701, the ROM 702 and the RAM 703 are connected to each other through a bus 704. An input/output (I/O) interface 705 is also connected to the bus 704.

Generally, the following devices can be connected to the I/O interface 705: an input device 706 including, for example, a touch screen, a touch pad, a keyboard, a mouse, a camera, a microphone, an accelerometer, a gyroscope, etc.; an output device 707 including, for example, a liquid crystal display (LCD), a speaker, a vibrator, etc.; a storage device 708 including, for example, a magnetic tape, a hard disk, etc.; and a communication device 709. The communication device 709 may allow the electronic device 700 to perform wireless or wired communication with other devices to exchange data. Although FIG. 7 shows an electronic device 700 with various devices, it should be understood that it is not required to implement or have all the devices as shown. More or fewer devices may alternatively be implemented or provided.

In an embodiment of the present disclosure, the process described above with reference to the flowchart can be implemented as a computer software program. For example, an embodiment of the present disclosure includes a computer program product including a computer program carried on a non-transitory computer-readable medium, which contains program codes for executing the method shown in the flowchart. In such an embodiment, the computer program can be downloaded and installed from the network through the communication device 709, or installed from the storage device 708, or installed from the ROM 702. When the computer program is executed by the processing device 701, the above functions defined in the method of the embodiment of the present disclosure are performed.

It should be noted that the computer-readable medium mentioned above in the present disclosure can be a computer-readable signal medium or a computer-readable storage medium or a combination of both. The computer-readable storage medium can be, for example, an electrical, magnetic, optical, electromagnetic, infrared, or semiconductor system, device or instrument, or a combination thereof. Examples of the computer-readable storage medium may include, but are not limited to, an electrical connection with at least one wire, a portable computer disk, a hard disk, a random-access memory (RAM), a read-only memory (ROM), an erasable programmable read-only memory (e.g., electronic programable read-only memory (EPROM) or flash memory), an optical fiber, a portable compact disk read-only memory (CD-ROM), an optical storage device, a magnetic storage device, or a suitable combination of the above. In the present disclosure, a computer-readable storage medium can be a tangible medium containing or storing a program, which can be used by or in combination with an instruction execution system, apparatus or device. In the present disclosure, a computer-readable signal medium may include a data signal propagated in baseband or as part of a carrier wave, in which computer-readable program codes are carried. This propagated data signal can be of many forms, including electromagnetic signal, optical signal or a suitable combination of the above. The computer-readable signal medium can also be a computer-readable medium other than a computer-readable storage medium, which can send, propagate or transmit a program for use by or in connection with an instruction execution system, apparatus or device. The program code contained in the computer-readable medium can be transmitted by a suitable medium, including wires, optical cables, radio frequency (RF) and the like, or a suitable combination of the above.

In some embodiments, the client and the server can communicate by using any currently known or future developed network protocol such as HyperText Transfer Protocol (HTTP), and can be interconnected with digital data communication in any form or medium (for example, communication network). Examples of communication networks include a local area network ("LAN"), a wide area network ("WAN"), the internet (for example, the Internet) and end-to-end networks (for example, ad hoc end-to-end network), as well as any currently known or future developed networks.

The above-mentioned computer-readable medium may be included in the electronic device; or may be separate without being assembled into the electronic device.

The above-mentioned computer-readable medium carries at least one program, which, when executed by the electronic device, cause the electronic device to: in response to a received service execution instruction, identify a target object in a video stream captured in real time, and determine position information of the target object in the video stream; display a virtual model on the target object in the video stream according to the position information; and play a target audio on loop, and control the virtual model to display a corresponding animation expression according to the target audio.

Computer program codes for performing the operations of the present disclosure may be written in one or more programming languages or their combinations, including object-oriented programming languages, such as Java, Smalltalk, C++, and conventional procedural programming languages, such as "C" language or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to the user's computer through any kind of network, including a local area network (LAN) or a wide area network (WAN), or may be connected to an external computer (for example, through the Internet from an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains at least one executable instruction for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiment described in the present disclosure can be realized by software or hardware. Among them, the name of the unit does not constitute the limitation of the unit itself in some cases. For example, the first acquisition unit can also be described as "the unit that acquires at least two Internet protocol addresses".

The functions described above in the present disclosure may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, device or apparatus, or any suitable combination of the above. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

In one embodiment, an electronic device is provided, including a memory and a processor, wherein the memory stores a computer program, and when the processor executes the computer program, the following steps are realized:

- identifying a target object in a video stream captured in real time in response to a received service execution instruction, and determining position information of the target object in the video stream;
- displaying a virtual model on the target object in the video stream according to the position information; and
- playing a target audio on loop, and controlling the virtual model to display a corresponding animation expression according to the target audio.

In one embodiment, a computer-readable storage medium on which a computer program is stored is also provided, and when the computer program is executed by a processor, the following steps are realized:

- identifying a target object in a video stream captured in real time in response to a received service execution instruction, and determining position information of the target object in the video stream;
- displaying a virtual model on the target object in the video stream according to the position information; and
- playing a target audio on loop, and controlling the virtual model to display a corresponding animation expression according to the target audio.

The image processing apparatus, the electronic device and the storage medium provided in the above embodiments can execute the image processing method provided in any embodiment of the present disclosure, and have corresponding functional modules and beneficial effects for executing the method. For technical details not particularly described in the above embodiments, reference can be made to the image processing method provided by any embodiment of the present disclosure.

According to one or more embodiments of the present disclosure, there is provided an image processing method, including:

identifying a target object in a video stream captured in real time in response to a received service execution instruction, and determining position information of the target object in the video stream;

displaying a virtual model on the target object in the video stream according to the position information; and playing a target audio on loop, and controlling the virtual model to display a corresponding animation expression according to the target audio.

According to one or more embodiments of the present disclosure, an image processing method as described above is provided and further includes: the target audio includes a plurality of audio tracks, different audio tracks are configured to control different virtual models, and animation expressions of the virtual models to which different audio tracks correspond are different; controlling the virtual model corresponding to the audio track to display the corresponding animation expression according to currently played audio track data.

According to one or more embodiments of the present disclosure, an image processing method as described above is provided and further includes: when a plurality of target objects is identified, determining a to-be-mounted object from the plurality of target objects; determining a target virtual model matched with the to-be-mounted object from a preset virtual model set according to a first size of the to-be-mounted object in the video stream; wherein the preset virtual model set includes a plurality of virtual models with different sizes; displaying the target virtual model correspondingly on the to-be-mounted object in the video stream according to the position information of the to-be-mounted object.

According to one or more embodiments of the present disclosure, an image processing method as described above is provided and further includes: positioning the to-be-mounted object in real time to determine whether a position of the to-be-mounted object in the video stream has changed; and in response to a change of the position of the to-be-mounted object in the video stream, displaying the target virtual model correspondingly on the to-be-mounted object in the video stream according to changed position information.

According to one or more embodiments of the present disclosure, an image processing method as described above is provided and further includes: acquiring a second size of the to-be-mounted object in the video stream, wherein the second size is different from the first size; and adjusting the target virtual model by scaling according to the second size.

According to one or more embodiments of the present disclosure, an image processing method as described above is provided and further includes: acquiring a size adjustment operation instruction for the target virtual model; and adjusting the target virtual model by scaling according to the size adjustment operation instruction.

According to one or more embodiments of the present disclosure, an image processing method as described above is provided and further includes: acquiring a background material ball corresponding to the video stream, an object material ball corresponding to the virtual model and a mask map of the virtual model; wherein the mask map includes facial feature information and local skin color information of the virtual model; fusing the background material ball and the object material ball according to the mask map to obtain a fused virtual model; performing an edge feathering process on the fused virtual model to obtain a feathered virtual model; and displaying the feathered virtual model on the target object in the video stream according to the position information.

According to one or more embodiments of the present disclosure, an image processing method as described above is provided and further includes: fusing the background material ball and the object material ball according to a green channel and a blue channel of the mask map to obtain the fused virtual model.

According to one or more embodiments of the present disclosure, an image processing method as described above is provided and further includes: acquiring edge light information of the fused virtual model; determining a feathering range of the fused virtual model according to a red channel of the mask map and the edge light information; and feathering the fused virtual model according to the feathering range to obtain the feathered virtual model.

According to one or more embodiments of the present disclosure, an image processing method as described above is provided and further includes: displaying subtitle information corresponding to the target audio synchronously in an interface of the video stream.

According to one or more embodiments of the present disclosure, an image processing method as described above is provided and further includes: displaying a service control and a shooting control in an interface of the video stream; wherein the service control is configured to trigger the service execution instruction, and the shooting control is configured to end a flow corresponding to the image processing method.

What is claimed is:

1. An image processing method, comprising:

in response to a received service execution instruction, identifying a target object in a video stream captured in real time, and determining position information of the target object in the video stream;

displaying a virtual model on the target object in the video stream according to the position information; and playing a target audio on loop, and controlling the virtual model to display a corresponding animation expression according to the target audio, wherein the animation expression of the virtual model dynamically changes with the played target audio, the target audio comprises a plurality of audio tracks, different audio tracks are configured to control different virtual models, and animation expressions of the virtual models to which different audio tracks correspond are different;

the controlling the virtual model to display the corresponding animation expression according to the target audio comprises:

controlling the virtual model corresponding to the audio track to display the corresponding animation expression according to currently played audio track data.

2. The image processing method according to claim 1, wherein when a plurality of target objects is identified, the displaying the virtual model on the target object in the video stream according to the position information comprises:

determining a to-be-mounted object from the plurality of target objects;

determining a target virtual model matched with the to-be-mounted object from a preset virtual model set according to a first size of the to-be-mounted object in the video stream; wherein the preset virtual model set comprises a plurality of virtual models with different sizes; and displaying the target virtual model correspondingly on the to-be-mounted object in the video stream according to the position information of the to-be-mounted object.

3. The image processing method according to claim 2, further comprising:

positioning the to-be-mounted object in real time to determine whether a position of the to-be-mounted object in the video stream has changed; and in response to a change of the position of the to-be-mounted object in the video stream, displaying the target virtual model correspondingly on the to-be-mounted object in the video stream according to changed position information.

4. The image processing method according to claim 3, further comprising:

in response to the change of the position of the to-be-mounted object in the video stream, acquiring a second size of the to-be-mounted object in the video stream, the second size being different from the first size; and adjusting the target virtual model by scaling according to the second size.

5. The image processing method according to claim 4, wherein the adjusting the target virtual model by scaling according to the second size comprises:

acquiring a size adjustment operation instruction for the target virtual model; and adjusting the target virtual model by scaling according to the size adjustment operation instruction.

6. The image processing method according to claim 1, wherein the displaying the virtual model on the target object in the video stream according to the position information comprises:

acquiring a background material ball corresponding to the video stream, an object material ball corresponding to the virtual model and a mask map of the virtual model, the mask map comprising facial feature information and local skin color information of the virtual model;

fusing the background material ball and the object material ball according to the mask map to obtain a fused virtual model;

performing an edge feathering process on the fused virtual model to obtain a feathered virtual model; and displaying the feathered virtual model on the target object in the video stream according to the position information.

7. The image processing method according to claim 6, wherein the fusing the background material ball and the object material ball according to the mask map to obtain the fused virtual model, comprises:

fusing the background material ball and the object material ball according to a green channel and a blue channel of the mask map to obtain the fused virtual model.

8. The image processing method according to claim 6, wherein the performing the edge feathering process on the fused virtual model to obtain the feathered virtual model, comprises:

acquiring edge light information of the fused virtual model;

determining a feathering range of the fused virtual model according to a red channel of the mask map and the edge light information; and feathering the fused virtual model according to the feathering range to obtain the feathered virtual model.

9. The image processing method according to claim 1, further comprising:

synchronously displaying, in an interface of the video stream, subtitle information corresponding to the target audio.

10. The image processing method according to claim 1, further comprising:

displaying a service control and a shooting control in an interface of the video stream; wherein the service control is configured to trigger the service execution instruction, and the shooting control is configured to end a flow corresponding to the image processing method.

11. An electronic device, comprising a memory and a processor, wherein a computer program is stored in the memory, and the processor, when executing the computer program, realizes an image processing method, comprising:

in response to a received service execution instruction, identifying a target object in a video stream captured in real time, and determining position information of the target object in the video stream;

displaying a virtual model on the target object in the video stream according to the position information; and playing a target audio on loop, and controlling the virtual model to display a corresponding animation expression according to the target audio, wherein the animation expression of the virtual model dynamically changes with the played target audio, the target audio comprises a plurality of audio tracks, different audio tracks are configured to control different virtual models, and animation expressions of the virtual models to which different audio tracks correspond are different;

the controlling the virtual model to display the corresponding animation expression according to the target audio comprises:

controlling the virtual model corresponding to the audio track to display the corresponding animation expression according to currently played audio track data.

12. The electronic device according to claim 11, wherein in the image processing method, when a plurality of target objects is identified, the displaying the virtual model on the target object in the video stream according to the position information comprises:

determining a to-be-mounted object from the plurality of target objects;

determining a target virtual model matched with the to-be-mounted object from a preset virtual model set according to a first size of the to-be-mounted object in the video stream; wherein the preset virtual model set comprises a plurality of virtual models with different sizes; and displaying the target virtual model correspondingly on the to-be-mounted object in the video stream according to the position information of the to-be-mounted object.

13. The electronic device according to claim 12, wherein the image processing method further comprises:

positioning the to-be-mounted object in real time to determine whether a position of the to-be-mounted object in the video stream has changed; and in response to a change of the position of the to-be-mounted object in the video stream, displaying the target virtual model correspondingly on the to-be-mounted object in the video stream according to changed position information.

14. The electronic device according to claim 13, wherein the image processing method further comprises:

in response to the change of the position of the to-be-mounted object in the video stream, acquiring a second size of the to-be-mounted object in the video stream, the second size being different from the first size; and adjusting the target virtual model by scaling according to the second size.

15. The electronic device according to claim 14, wherein in the image processing method, the adjusting the target virtual model by scaling according to the second size comprises:

acquiring a size adjustment operation instruction for the target virtual model; and adjusting the target virtual model by scaling according to the size adjustment operation instruction.

16. The electronic device according to claim 11, wherein in the image processing method, the displaying the virtual model on the target object in the video stream according to the position information comprises:

acquiring a background material ball corresponding to the video stream, an object material ball corresponding to the virtual model and a mask map of the virtual model, the mask map comprising facial feature information and local skin color information of the virtual model;

fusing the background material ball and the object material ball according to the mask map to obtain a fused virtual model;

performing an edge feathering process on the fused virtual model to obtain a feathered virtual model; and displaying the feathered virtual model on the target object in the video stream according to the position information.

17. The electronic device according to claim 16, wherein in the image processing method, the fusing the background material ball and the object material ball according to the mask map to obtain the fused virtual model, comprises:

fusing the background material ball and the object material ball according to a green channel and a blue channel of the mask map to obtain the fused virtual model.

18. The electronic device according to claim 11, wherein the image processing method further comprises:

synchronously displaying, in an interface of the video stream, subtitle information corresponding to the target audio.

19. The electronic device according to claim 11, wherein the image processing method further comprises:

displaying a service control and a shooting control in an interface of the video stream; wherein the service control is configured to trigger the service execution instruction, and the shooting control is configured to end a flow corresponding to the image processing method.

20. A non-transitory computer-readable storage medium having a computer program stored therein, wherein the computer program, when executed by a processor, realizes an image processing method, comprising:

in response to a received service execution instruction, identifying a target object in a video stream captured in real time, and determining position information of the target object in the video stream;

displaying a virtual model on the target object in the video stream according to the position information; and playing a target audio on loop, and controlling the virtual model to display a corresponding animation expression according to the target audio, wherein the animation expression of the virtual model dynamically changes with the played target audio, the target audio comprises a plurality of audio tracks, different audio tracks are configured to control different virtual models, and animation expressions of the virtual models to which different audio tracks correspond are different;

the controlling the virtual model to display the corresponding animation expression according to the target audio comprises:

controlling the virtual model corresponding to the audio track to display the corresponding animation expression according to currently played audio track data.

* * * * *